United States Patent
Yamaguchi et al.

(10) Patent No.: US 11,008,409 B2
(45) Date of Patent: May 18, 2021

(54) METHOD FOR PRODUCING BUTENE POLYMER

(71) Applicant: ENEOS Corporation, Tokyo (JP)

(72) Inventors: Tatsuo Yamaguchi, Tokyo (JP); Koichi Sato, Tokyo (JP); Tatsuya Chiba, Tokyo (JP); Teruhisa Kuroki, Tokyo (JP)

(73) Assignee: ENEOS Corporation, Tokyo (JP)

( * ) Notice: Subject to any disclaimer, the term of this patent is extended or adjusted under 35 U.S.C. 154(b) by 301 days.

(21) Appl. No.: 16/061,523

(22) PCT Filed: Dec. 15, 2016

(86) PCT No.: PCT/JP2016/087419
§ 371 (c)(1),
(2) Date: Jun. 12, 2018

(87) PCT Pub. No.: WO2017/104758
PCT Pub. Date: Jun. 22, 2017

(65) Prior Publication Data
US 2020/0270377 A1    Aug. 27, 2020

(30) Foreign Application Priority Data
Dec. 17, 2015  (JP) .............................. JP2015-246314

(51) Int. Cl.
*C08F 10/10* (2006.01)
*C08F 4/14* (2006.01)
*C08F 2/06* (2006.01)
*C10G 11/05* (2006.01)

(52) U.S. Cl.
CPC .................................. *C08F 10/10* (2013.01)

(58) Field of Classification Search
USPC ............................................. 526/237, 348.7
See application file for complete search history.

(56) References Cited

U.S. PATENT DOCUMENTS

| | | | |
|---|---|---|---|
| 3,074,878 A | 1/1963 | Pappas | |
| 4,419,221 A | 12/1983 | Castagnos, Jr. et al. | |
| 4,980,053 A | 12/1990 | Li et al. | |
| 5,191,044 A * | 3/1993 | Rath | C08F 10/10 526/212 |
| 5,326,465 A | 7/1994 | Yongqing et al. | |
| 5,462,652 A | 10/1995 | Wegerer | |
| 5,904,837 A * | 5/1999 | Fujiyama | C10G 11/18 208/164 |
| 6,045,690 A * | 4/2000 | Fujiyama | C10G 11/18 208/153 |
| 7,217,773 B2 * | 5/2007 | Rath | C08F 110/10 526/208 |
| 2004/0198937 A1 | 10/2004 | Auer et al. | |

FOREIGN PATENT DOCUMENTS

| | | |
|---|---|---|
| CN | 101460530 | 6/2009 |
| CN | 102603950 | 7/2012 |
| EP | 0 315 179 A | 5/1989 |
| JP | S60-69109 A | 4/1985 |
| JP | H01-132609 A | 5/1989 |
| JP | 2000-80127 A | 3/2000 |
| JP | 2004-533525 A | 11/2004 |
| JP | 2006-63151 A | 3/2006 |
| WO | 03/004540 A1 | 1/2003 |

OTHER PUBLICATIONS

European Search Report in EP App. No. 16875735.9 dated Aug. 21, 2019.
International Search Report issued in PCT/JP2016/087419, dated Mar. 14, 2017.
International Preliminary Report on Patentability issued in PCT/JP2016/087419, dated Jun. 19, 2018.
Office Action issued in CN Patent Application No. 201680072562.4 dated Feb. 2, 2020, English translation.

* cited by examiner

*Primary Examiner* — Fred M Teskin
(74) *Attorney, Agent, or Firm* — Greenblum & Bernstein, P.L.C.

(57) ABSTRACT

Provided is a method for producing a butene polymer, comprising: a polymerization step of performing polymerization reaction by contacting a raw material component comprising 20% by mass or more of isobutene with a Lewis acid catalyst; and a distillation step of subjecting a solution to be treated containing a reaction product of the polymerization reaction and a butene oligomer added to the reaction product to distillation treatment to obtain the butene polymer, wherein an amount of the butene oligomer added is 25 parts by mass or larger with respect to 100 parts by mass of the reaction product.

13 Claims, No Drawings

METHOD FOR PRODUCING BUTENE POLYMER

TECHNICAL FIELD

The present invention relates to a method for producing a butene polymer.

BACKGROUND ART

Mixtures consisting of olefins composed mainly of isobutene, and saturated hydrocarbons (mixed C4 components) are obtained by removing dienes according to the need from hydrocarbons having 4 carbon atoms obtained from various processes of petrochemistry and petroleum refinery. Methods for producing various butene polymers by using this mixture as a raw material have heretofore been known (e.g., Patent Literatures 1 to 4).

CITATION LIST

Patent Literature

Patent Literature 1: Japanese Unexamined Patent Publication No. S60-69109
Patent Literature 2: Japanese Unexamined Patent Publication No. H1-132609
Patent Literature 3: Japanese Unexamined Patent Publication No. 2000-80127
Patent Literature 4: Japanese Unexamined Patent Publication No. 2006-63151

SUMMARY OF INVENTION

Technical Problem

Low-molecular-weight butene oligomers which deteriorate the properties of butene polymers are contained in reaction products by the polymerization reaction of isobutene, and it is desired to remove this butene oligomer by distillation treatment.

However, if the conversion rate of isobutene is enhanced in order to attain an economically preferable reaction scheme, the viscosity of a reaction product after polymerization reaction becomes remarkably high so that heat transfer from a heat source might get worse for distillation treatment, resulting in the need of increasing a heat source temperature, or unstable distillation (bumping, etc.) derived from the temperature nonuniformity of an internal solution might easily occur, resulting in problems such as reduction in productivity and deterioration in the quality of a final product butene polymer.

One of the objects of the present invention is to provide a method for producing a butene polymer which is capable of producing a high-quality butene polymer with good productivity.

Solution to Problem

One aspect of the present invention relates to a method for producing a butene polymer, comprising: a polymerization step of performing polymerization reaction by contacting a raw material component comprising 20% by mass or more of isobutene with a Lewis acid catalyst; and a distillation step of subjecting a solution to be treated containing a reaction product of the polymerization reaction and a butene oligomer added to the reaction product to distillation treatment to obtain the butene polymer, wherein an amount of the butene oligomer added is 25 parts by mass or larger with respect to 100 parts by mass of the reaction product.

In one aspect, the butene oligomer can be a mixture of a dimer to a pentamer of butene.

In one aspect, the Lewis acid catalyst can be aluminum chloride, alkyl aluminum dichloride or a boron trifluoride complex.

In one aspect, the boron trifluoride complex can be a complex of boron trifluoride and a complexing agent, and the complexing agent can be a primary alcohol.

In one aspect, each of contents of moisture, a sulfur-containing compound and an oxygen-containing compound in the raw material component in the polymerization step can be 100 ppm by mass or smaller.

In one aspect, the method for producing a butene polymer can further comprise, before the polymerization step, a pretreatment step of adjusting each of the contents of moisture, a sulfur-containing compound and an oxygen-containing compound in the raw material component to 100 ppm by mass or smaller by contacting the raw material component with a solid treatment agent.

In one aspect, the amount of the butene oligomer added can be 65 parts by mass or larger with respect to 100 parts by mass of the reaction product.

In one aspect, a content of 1,3-butadiene in the raw material component in the polymerization step can be 1000 ppm by mass or smaller.

In one aspect, the method for producing a butene polymer can further comprise: an addition step of adding the butene oligomer to the reaction solution of the polymerization reaction; and a water washing step of water-washing the reaction solution supplemented with the butene oligomer to obtain the solution to be treated containing the reaction product and the butene oligomer.

In one aspect, the method for producing a butene polymer can further comprise: a water washing step of water-washing the reaction solution of the polymerization reaction to obtain an organic phase containing the reaction product; and an addition step of adding the butene oligomer to the organic phase obtained in the water washing step to obtain the solution to be treated containing the reaction product and the butene oligomer.

In one aspect, the distillation step can be a step of subjecting the solution to be treated to distillation treatment to obtain the butene polymer and an oligomer component comprising the butene oligomer.

Also, in one aspect, the oligomer component can be recycled for addition to the reaction product.

In one aspect, the raw material component can comprise a dilution of isobutene with a saturated hydrocarbon.

In one aspect, the raw material component can comprise hydrocarbons having 4 carbon atoms formed by naphtha cracking.

In one aspect, the raw material component can comprise hydrocarbons having 4 carbon atoms obtained by first fluid catalytic cracking of contacting a heavy oil with a fluid catalytic cracking catalyst on the conditions that a reaction zone exit temperature is 400° C. or higher and lower than 550° C., a catalyst/oil ratio is 2.0 to 15.0 in terms of a mass ratio, and a residence time of hydrocarbons in the reaction zone is 1.0 to 10.0 seconds.

In one aspect, the raw material component can comprise hydrocarbons having 4 carbon atoms obtained by second fluid catalytic cracking of contacting a heavy oil with a catalyst containing 12 to 24% by mass of shape-selective zeolite on the conditions that a reaction zone exit temperature is 580 to 630° C., a catalyst/oil ratio is 15 to 40 in terms of a mass ratio, and a residence time of hydrocarbons in the reaction zone is 0.1 to 1.0 seconds.

Advantageous Effects of Invention

According to the present invention, a method for producing a butene polymer which is capable of producing a high-quality butene polymer with good productivity can be provided.

DESCRIPTION OF EMBODIMENTS

Hereinafter, preferable embodiments of the present invention will be described.

The method for producing a butene polymer according to the present embodiment comprises: a polymerization step of performing polymerization reaction by contacting a raw material component comprising 20% by mass or more of isobutene with a Lewis acid catalyst; and a distillation step of subjecting a solution to be treated containing a reaction product of the polymerization reaction and a butene oligomer added to the reaction product to distillation treatment to obtain the butene polymer. Also, in the present embodiment, the amount of the butene oligomer added is 25 parts by mass or larger with respect to 100 parts by mass of the reaction product.

In the production method according to the present embodiment, the aforementioned problems associated with a distillation step are solved by preparing a solution to be treated containing a butene oligomer added to the reaction product, and subjecting the solution to be treated to a distillation step, and a high-quality butene polymer can be produced with good productivity.

In the production method according to the present embodiment, a raw material component comprising 20% by mass or more of isobutene is used. The content of the isobutene in the raw material component can be 30% by mass or larger and may be 35% by mass or larger, based on the total amount of the raw material component. A yield per time in the polymerization step can thereby be sufficiently enhanced. Also, the content of the isobutene in the raw material component can be 70% by mass or smaller and may be 60% by mass or smaller, based on the total amount of the raw material component. The stability of the polymerization reaction thereby improves, and a high-quality butene polymer can be stably produced.

The raw material component can further comprise a component other than isobutene. For example, the raw material component can further comprise a saturated hydrocarbon such as n-butane, isobutane, n-hexane, or branched hexane (preferably a saturated hydrocarbon having 4 to 6 carbon atoms). The content of the saturated hydrocarbon in the raw material component can be, for example, 30% by mass or larger and may be 40% by mass or larger, based on the total amount of the raw material component. Also, the content of the saturated hydrocarbon can be 70% by mass or smaller and may be 65% by mass or smaller, based on the total amount of the raw material component.

The raw material component may further comprise a linear unsaturated hydrocarbon such as 1-butene or 2-butene. However, it is preferable that the content of the unsaturated hydrocarbon in the raw material component should be 5% by mass or smaller, it is more preferable to be 3% by mass or smaller, and it is further preferable to be 1% by mass or smaller, based on the total amount of the raw material component. By setting the content of the unsaturated hydrocarbon to within such a range, there is a tendency that the quality of the butene polymer further improves. Also, the raw material component can further comprise 1,3-butadiene, and it is preferable that the content of the 1,3-butadiene should be 1000 ppm by mass or smaller, it is more preferable to be 200 ppm by mass or smaller, it is further preferable to be 10 ppm by mass or smaller, and it is still further preferable to be 1 ppm by mass or smaller, based on the total amount of the raw material component.

The raw material component may further comprise impurities such as moisture, a sulfur-containing compound, and an oxygen-containing compound. However, it is preferable that these impurities should be removed to predetermined amounts or less before the polymerization step. It is preferable that each of the contents of the moisture, the sulfur-containing compound and the oxygen-containing compound in the raw material component to be subjected to the polymerization step should be 100 ppm by mass or smaller, it is more preferable to be 10 ppm by mass or smaller, and it is further preferable to be 1 ppm by mass or smaller. In the production method according to the present embodiment, a raw material component whose contents of the impurities are small (or zero) may be used, and a step of reducing the contents of the impurities in the raw material component before the polymerization step (e.g., a pretreatment step mentioned later) may be carried out.

For example, a dilution of isobutene with a saturated hydrocarbon can be used as the raw material component. The dilution can be, for example, a product prepared by diluting pure isobutene obtained by an existing production method with a saturated hydrocarbon such as butane or hexane.

The raw material component can be, for example, one comprising a mixture of hydrocarbons having 4 carbon atoms (also referred to as a mixed C4 component) formed by naphtha cracking. Such a mixed C4 component can be, for example, a product prepared by separating a fraction composed mainly of hydrocarbons having 4 carbon atoms by first distillation treatment from hydrocarbon components produced in a naphtha cracking apparatus, and subjecting the fraction to the removal of butadiene, increase in isobutene concentration by second distillation treatment, etc. according to the need. In the second distillation treatment, reactive distillation of isomerizing 1-butene into 2-butene may be performed in order to separate isobutene and 1-butene which have similar boiling points. In addition to naphtha, butane, kerosene, a light oil, or the like can also be used as a raw material to be applied to the naphtha cracking apparatus.

The raw material component can be, for example, one comprising a mixture of hydrocarbons having 4 carbon atoms (mixed C4 component) obtained by the fluid catalytic cracking of a heavy oil. In the fluid catalytic cracking, a petroleum-based hydrocarbon is cracked by contacting the petroleum-based hydrocarbon which is a heavy oil with a fluid catalytic cracking catalyst. In the fluid catalytic cracking, for example, light olefins are produced, and the mixed C4 component is obtained by separating hydrocarbons having 4 carbon atoms from the light olefins.

The conditions of the fluid catalytic cracking can be conditions that can form light olefins and may adopt conditions known in the art. Examples of the method for producing light olefins by the fluid catalytic cracking of a heavy oil include a method of shortening a contact time of a catalyst and a raw material oil (U.S. Pat. Nos. 4,419,221, 3,074,878, 5,462,652, and European Patent Application Publication No. 315179), a method of performing a reaction at a high temperature (U.S. Pat. No. 4,980,053), and a method using pentasil-type zeolite (U.S. Pat. No. 5,326, 465).

The fluid catalytic cracking apparatus to be used in the fluid catalytic cracking can be, for example, a fluid catalytic cracking reaction apparatus having a downflow-format reaction zone, a gas-solid separation zone, a stripping zone and a catalyst regeneration zone.

The heavy oil to be used in the fluid catalytic cracking can be, for example, a vacuum gas oil, an atmospheric residue oil, a vacuum residue oil, a cracked gas oil, a heavy oil prepared by hydrorefining these, or a component obtained by further subjecting these to extraction with a light oil or a solvent. In the fluid catalytic cracking, these heavy oils may be used alone, or a mixture of these heavy oils or these heavy oils partially mixed with a light oil may also be used. As for the distillation properties of the heavy oil to be used in the fluid catalytic cracking, for example, it is preferable that the boiling point range should be 170 to 800° C., and it is more preferable to be 190 to 780° C.

In the distillation treatment after the fluid catalytic cracking, reactive distillation of isomerizing 1-butene into 2-butene may be performed in order to separate isobutene and 1-butene which have similar boiling points. Also, 1,3-butadiene may be removed by distillation or the like according to the need.

Examples of a preferable aspect of the fluid catalytic cracking include a method of contacting a heavy oil with a fluid catalytic cracking catalyst on the conditions that the reaction zone exit temperature is 400° C. or higher and lower than 550° C. (preferably 450° C. or higher and lower than 530° C.), the catalyst/oil ratio is 2.0 to 15.0 (preferably 3.0 to 10.0, more preferably 5.0 to 7.0) in terms of a mass ratio, and the residence time of hydrocarbons in the reaction zone is 1.0 to 10.0 seconds (preferably 1.0 to 5.0 seconds, more preferably 2.0 to 4.0 seconds). Such a fluid catalytic cracking catalyst can be, for example, a catalyst containing an amorphous substance such as silica alumina, a crystalline substance such as zeolite, or a mixture thereof. Such fluid catalytic cracking can be carried out with reference to, for example, the description of "Sekiyu Seisei Purosesu (Petroleum Refinery Process in English), edited by The Japan Petroleum Institute, issued on May 20, 1998, Kodansha Ltd." and literatures cited therein.

Examples of another preferable aspect of the fluid catalytic cracking include a method of contacting a heavy oil with a catalyst containing 12 to 24% by mass of shape-selective zeolite on the conditions that the reaction zone exit temperature is 580 to 630° C., the catalyst/oil ratio is 15 to 40 in terms of a mass ratio, and the residence time of hydrocarbons in the reaction zone is 0.1 to 1.0 seconds. The catalyst for such fluid catalytic cracking can be a catalyst containing a fluid catalytic cracking catalyst generally used and an additive containing shape-selective zeolite. In this aspect, the fluid catalytic cracking catalyst can be, for example, one containing 5 to 50% by mass of ultrastable Y zeolite. Also, in this aspect, it is preferable that the ratio of the additive to the catalyst should be 17 to 60% by mass, and it is preferable that the ratio of the shape-selective zeolite to the additive should be 20 to 70% by mass. Also, in this aspect, it is preferable that the content of rare earth metal oxide in the fluid catalytic cracking catalyst should be 1.5% by mass or smaller. One whose crystal lattice constant is 24.20 to 24.60 angstroms is preferably used as the ultrastable Y zeolite.

Hereinafter, each step in the production method according to the present embodiment will be described.

The production method according to the present embodiment can further comprise, before the polymerization step, a pretreatment step of adjusting each of the contents of moisture, a sulfur-containing compound and an oxygen-containing compound in the raw material component to 100 ppm by mass or smaller by contacting the raw material component with a solid treatment agent.

The solid treatment agent can be, for example, an adsorbent that adsorbs at least one of the moisture, the sulfur-containing compound and the oxygen-containing compound. The solid treatment agent can be, for example, alumina or a composite material containing alumina.

Specific examples of the solid treatment agent include alumina, silica alumina, and alumina zeolite. Also, for example, a commercially available product such as AZ300 manufactured by Honeywell UOP which is a hybrid of a zeolite molecular sieve and modified activated alumina may be used as the solid treatment agent. The solid treatment agent may be one modified by using an appropriate binder.

When the solid treatment agent is alumina, the surface area of the alumina can be, for example, 1 to 500 m$^2$/g. One modified by supporting other metals such as an alkali metal and an alkaline earth metal may be used as the alumina. However, from the viewpoint of more inexpensively obtaining the solid treatment agent, it is preferable that each of the contents of the alkali metal and the alkaline earth metal in the alumina should be 0.5% by mass or smaller.

Zeolites such as zeolite A, zeolite L, zeolite X and zeolite Y may be used as the solid treatment agent, and these may be substituted by an alkali metal ion.

The temperature in contacting the raw material component with the solid treatment agent can be appropriately changed according to the type of the solid treatment agent, etc. Because the polymerization reaction of olefins might progress in the case where the treatment temperature is too high, and treatment effects might not be sufficient if it is too low, the temperature range can be set in consideration of these. The treatment temperature can be, for example, −30° C. or higher and can be −10° C. or higher. Also, the treatment temperature can be, for example, 100° C. or lower and can be 50° C. or lower.

The contact time of the raw material component and the solid treatment agent can be in the range where sufficient treatment effects are obtained. The contact time can be, for example, approximately 1 minute to 10 hours. The method for the contact can be, for example, a batch format and may be a continuous format. In the case of a continuous format, a method such as an immobilized bed format or a fluidized bed format can be adopted, and any of upflow and downflow may be adopted as the direction of flow.

The pretreatment step can be carried out, for example, in the case where the content of at least one of the moisture, the sulfur-containing compound and the oxygen-containing compound in the raw material component exceeds 100 ppm by mass. The pretreatment step may be omitted in the case where all of the contents of the moisture, the sulfur-containing compound and the oxygen-containing compound in the raw material component are 100 ppm by mass or smaller. The pretreatment step may be carried out for further reduction in the contents even in the case where all of the contents of the moisture, the sulfur-containing compound and the oxygen-containing compound in the raw material component are 100 ppm by mass or smaller.

Next, the polymerization step will be described. In the polymerization step, polymerization reaction is performed by contacting a raw material component with a Lewis acid catalyst. The raw material component can be, for example, one that has undergone the aforementioned pretreatment step.

The polymerization reaction can be performed under a cation polymerization mechanism by the Lewis acid catalyst. The Lewis acid catalyst can be appropriately selected from, for example, those functioning as a catalyst for the cation polymerization of isobutene. Examples of the preferable Lewis acid catalyst include aluminum chloride, alkyl aluminum dichloride, and a boron trifluoride complex.

The boron trifluoride complex can be a complex of boron trifluoride and a complexing agent. Examples of the boron trifluoride complex include a boron trifluoride alcohol complex and a boron trifluoride ether complex. These may be used alone or used in combination of two or more.

A boron trifluoride alcohol complex is preferably used as the boron trifluoride complex. The boron trifluoride complex is a complex of boron trifluoride and an alcohol compound, and examples of the alcohol compound which is a complexing agent include methanol, ethanol, propanol, isopropyl alcohol, n-butanol, tert-butanol, n-nonanol, and isononanol. As the complexing agent alcohol compound, a primary alcohol is preferable, and methanol is particularly preferable.

It is preferable that the boron trifluoride alcohol complex should contain 1.0 to 3.0 mol of the alcohol compound, it is more preferable to contain 1.5 to 2.5 mol of the alcohol compound, and it is further preferable to contain 1.5 to 2.0 mol of the alcohol compound, with respect to 1 mol of the boron trifluoride.

In the polymerization reaction using the boron trifluoride complex, the molar ratio of the boron trifluoride in the boron trifluoride complex to the isobutene in the raw material component can be $1.0 \times 10^{-5}$ or more, it is preferable to be $5.0 \times 10^{-5}$ or more, and it is more preferable to be $1.0 \times 10^{-4}$ or more. Such a catalytic amount can allow the polymerization reaction to progress sufficiently. Also, the molar ratio of the boron trifluoride in the boron trifluoride complex to the isobutene in the raw material component can be $1.0 \times 10^{-2}$ or less. With such a catalytic amount, the control of the number-average molecular weight Mn and disparity Mw/Mn of the resulting butene polymer becomes easy, and reduction in catalyst cost and burdens of aftertreatment can be achieved. In the present embodiment, the molecular weight control of the butene polymer can be performed by the adjustment of the reaction temperature, the ratio between the boron trifluoride and the complexing agent, the catalytic amount, etc.

The alkyl aluminum dichloride can be a compound in which one of the chlorine atoms of aluminum chloride is replaced with an alkyl group. The alkyl group can be, for example, a methyl group or an ethyl group.

In the polymerization reaction using the aluminum chloride or the alkyl aluminum dichloride, the molar ratio of the aluminum atom to the isobutene in the raw material component can be $1.0 \times 10^{-5}$ or more, it is preferable to be $1.0 \times 10^{-4}$ or more, and it is more preferable to be $1.0 \times 10^{-3}$ or more. Such a catalytic amount can allow the polymerization reaction to progress sufficiently. Also, the molar ratio of the aluminum atom to the isobutene in the raw material component can be 1.0 or less and can be $1.0 \times 10^{-1}$ or less. In such a catalytic amount, the control of the number-average molecular weight Mn and disparity Mw/Mn of the resulting butene polymer becomes easy, and reduction in catalyst cost and burdens of aftertreatment can be achieved.

From the viewpoint of performing the reaction in a liquid phase, it is preferable that the reaction temperature of the polymerization reaction should be −30 to 0° C., and it is more preferable to be −25 to −10° C. As the reaction temperature becomes a lower temperature, there is a tendency that the conversion rate of isobutene is suppressed. As the reaction temperature becomes a higher temperature, there is a tendency that side reaction easily occurs while the conversion rate is suppressed.

The polymerization reaction apparatus that carries out the polymerization reaction is not particularly limited and can be, for example, a vessel-type reaction apparatus. The reaction format of the polymerization reaction may be any of a batch format and a continuous format. From the viewpoint of industrial production efficiency, it is preferable that that polymerization reaction should be performed in a continuous format. For the continuous format, the contact time between the catalyst and the raw material component is important. In the present embodiment, it is preferable that the contact time of the Lewis acid catalyst and the raw material component should be in the range of, for example, 10 minutes to 4 hours. By setting such a contact time, side reaction is suppressed, and economic loss can also be suppressed, while a sufficient isobutene conversion rate is achieved.

The conversion rate of isobutene in the polymerization reaction can be 60% or more, it is preferable to be 70% or more, and it is more preferable to be 75% or more. In the case of performing the polymerization reaction so as to attain such a conversion rate, the aforementioned effects of the present invention are remarkably exerted. Also, the conversion rate of isobutene in the polymerization reaction can be, for example, 99% or less and may be 95% or less. The stability of the polymerization reaction thereby improves, and a high-quality butene polymer can be stably produced.

Next, the distillation step will be described. In the distillation step, a solution to be treated containing a reaction product of the polymerization reaction and a butene oligomer added to the reaction product is subjected to distillation treatment. The butene polymer is obtained by removing low-molecular-weight components in the solution to be treated by the distillation treatment.

The solution to be treated can be prepared by an addition step and a water washing step according to a first aspect or a water washing step and an addition step according to a second aspect as mentioned later.

Because the solution to be treated is supplemented with a butene oligomer in a predetermined amount or larger, its viscosity is sufficiently low. Distillation apparatuses that are currently used in industry have a system having a jacket outside a distillation still or a system having an inner coil inside a distillation still, and generally warm a distillation mother liquor inside the distillation still by circulating a heat medium oil heated outside the jacket or the coil. In this respect, if the viscosity of the distillation mother liquor (i.e., the solution to be treated) is high, heat conductivity gets worse so that an alienation between the heat medium oil temperature and the temperature of the distillation mother liquor becomes large. That is, in the distillation mother liquor, a large temperature difference occurs between a portion in contact with (or close to) the jacket or the coil and a portion distant from the jacket or the coil. If such a temperature difference occurs, a bumping phenomenon easily occurs, and a butene polymer that should remain at the distillation bottom might be distilled off, resulting in reduction in yield. In the present embodiment, because the solution to be treated is supplemented with a butene oligomer in a predetermined amount or larger, the heat conductivity of the distillation mother liquor improves, and a bumping phenomenon is unlikely to occur.

The amount of the butene oligomer added is 25 parts by mass or larger, preferably 30 parts by mass or larger, more preferably 65 parts by mass or larger, with respect to 100 parts by mass of the reaction product According to such an amount added, the effects described above are more remarkably exerted. Also, the amount of the butene oligomer added can be 500 parts by mass or smaller and may be 450 parts by mass or smaller, with respect to 100 parts by mass of the reaction product. The amount of the reaction product formed in the polymerization step can be determined from the conversion rate of isobutene.

The butene oligomer to be added to the reaction product can be a mixture of a dimer to a undecamer of butene, can be a mixture of a dimer to a pentamer of butene, and may be a mixture of a dimer to a tetramer of butene. The butene can be one or two or more of isobutene, 1-butene and 2-butene, and it is preferable to be isobutene.

Although the butene polymer is a polymer having a hexamer or higher polymer of butene as a main component, a small amount of a pentamer or lower butene oligomer may be contained by remaining in the distillation treatment or the like without impairing the object of the present invention, and similarly, a portion of the oligomer added to the reaction product may remain in the butene polymer without impairing the object of the present invention.

In the distillation step, low-molecular-weight components are removed from the solution to be treated by distillation treatment. The low-molecular-weight components can include unreacted components of isobutene, saturated hydrocarbons, and the like, and may include butene oligomers such as a dimer to a pentamer of butene.

The conditions of the distillation treatment can be conditions that can sufficiently remove the low-molecular-weight components from the butene polymer. For example, the distillation treatment can be carried out such that the content of components having 12 or less carbon atoms in the butene polymer is 0.2% by mass or smaller. In the production method according to the present embodiment, the amount of residual halogen in the butene polymer can be reduced by carrying out the distillation treatment as described above because organic halogen matter is unevenly distributed specifically in the components having 12 or less carbon atoms.

The method for the distillation treatment is not particularly limited and may be a continuous format or a batch format. Also, the pressure in the distillation treatment may be normal pressure or reduced pressure. The distillation treatment may be steam distillation.

In one aspect, the distillation step can be a step of obtaining the butene polymer and an oligomer component by distillation treatment. The oligomer component can comprise the butene oligomer added to the reaction product and may comprise a butene oligomer in the reaction product formed by the polymerization reaction. The oligomer component obtained in the distillation step can be recycled as the butene oligomer to be added to the reaction product.

In one aspect, the distillation step can be a step of further recovering an unreacted raw material (isobutene) in the reaction product by distillation treatment. The recovered isobutene may be recycled as a portion of the raw material component of the polymerization reaction after removal of impurities and the like according to the need.

The production method according to the present embodiment can further comprise, after the polymerization step, a step for obtaining the solution to be treated that is to be subjected to the distillation treatment.

In a first aspect, the production method can further comprise: an addition step of adding the butene oligomer to the reaction solution of the polymerization reaction; and a water washing step of water-washing the reaction solution supplemented with the butene polymer to obtain the solution to be treated containing the reaction product and the butene oligomer.

In the addition step according to the first aspect (hereinafter, also referred to as a first addition step), the butene oligomer is added to the reaction solution of the polymerization reaction.

The Lewis acid catalyst to be used in the polymerization reaction contains halogen, which becomes partly responsible for reduction in quality such as reduction in transparency if remaining in the butene polymer. Therefore, after the polymerization reaction, it is desired to deactivate the Lewis acid catalyst and further remove the Lewis acid catalyst by washing with a large amount of water or a basic aqueous solution. However, if the conversion rate of isobutene is enhanced in order to attain an economically preferable reaction scheme, there is a case where the reaction solution after the polymerization reaction becomes inferior in miscibility with water (or the basic aqueous solution), and the Lewis acid catalyst is not sufficiently removed by water washing so that halogen remains in the butene polymer. If the Lewis acid catalyst is contained in the solution to be treated that is to be subjected to the distillation treatment, there is also a case where unfavorable side reaction such as the isomerization of terminal vinylidene into internal olefin occurs during the distillation treatment.

In contrast to this, in the first aspect, by adding the butene oligomer to the reaction solution of the polymerization reaction in the first addition step, the miscibility of the reaction solution with water (or the basic aqueous solution) gets better, and oil-water separation is also facilitated. Therefore, in the first aspect, the Lewis acid catalyst can be sufficiently removed by water washing, and the amount of residual halogen in the butene polymer can be sufficiently reduced. Furthermore, in the first aspect, the remaining of the catalyst in the solution to be treated can be sufficiently prevented, and side reaction during the distillation treatment can be sufficiently suppressed.

It is preferable that the amount of the butene oligomer added should be 25% by mass or larger, it is more preferable to be 30% by mass or larger, and it is further preferable to be 65% by mass or larger, with respect to 100 parts by mass of the butene polymer in the reaction solution. The amount of the butene oligomer added in the first addition step can be a portion of the butene oligomer in the solution to be treated that is to be subjected to the distillation step, or may be the whole. The butene oligomer can also be added, for example, after water washing mentioned later.

In the first addition step, the oligomer component obtained in the distillation step may be added to the reaction solution. In this case, higher efficiency of the production process can be achieved by using an essentially unnecessary oligomer component that is formed by the polymerization reaction.

In the first aspect, the catalyst can be deactivated by adding water or a basic substance to the reaction solution before the addition step, and the catalyst may be deactivated by adding water or a basic substance to the reaction solution after the addition step. The basic substance can be one that can deactivate the Lewis acid catalyst, can be a basic aqueous solution such as an aqueous sodium hydroxide solution, may be a solid such as hydrated lime, and may be a gas such as ammonia.

The water washing step according to the first aspect (hereinafter, also referred to as a first water washing step) is a step of water-washing the reaction solution supplemented with the butene oligomer to obtain the solution to be treated containing the reaction product and the butene oligomer.

The first water washing step can be performed, for example, by adding water or a basic aqueous solution to the reaction solution, extracting water-soluble components (Lewis acid catalyst, etc.) in the reaction solution into an aqueous phase, and then separating the aqueous phase and an organic phase. In the first water washing step, water washing may be performed a plurality of times. The method for the oil-water separation is not particularly limited and can adopt, for example, an inclined drum format that exploits specific gravity difference.

In the first aspect, the organic phase after the oil-water separation can be subjected as the solution to be treated to the distillation step, and a product prepared by removing a portion of low-molecular-weight components from the organic phase may be subjected as the solution to be treated to the distillation step.

In a second aspect, the production method can further comprise: a water washing step of water-washing the reaction solution of the polymerization reaction to obtain an organic phase containing the reaction product (also referred to as a second water washing step); and an addition step of adding the butene oligomer to the organic phase obtained in the water washing step to obtain the solution to be treated containing the reaction product and the butene oligomer (also referred to as a second addition step).

The second water washing step can be performed, for example, by adding water or a basic aqueous solution to the reaction solution of the polymerization reaction, extracting water-soluble components (Lewis acid catalyst, etc.) in the reaction solution into an aqueous phase, and then separating the aqueous phase and an organic phase. In the second water washing step, water washing may be performed a plurality of times. The method for the oil-water separation is not particularly limited and can adopt, for example, an inclined drum format that exploits specific gravity difference.

In the second aspect, the organic phase after the oil-water separation can be directly subjected to the addition step and may be subjected to the addition step after removal of a portion of low-molecular-weight components from the organic phase.

In the second aspect, the catalyst may be deactivated by adding water or a basic substance to the reaction solution before the water washing step. The basic substance can be one that can deactivate the Lewis acid catalyst, can be a basic aqueous solution such as an aqueous sodium hydroxide solution, may be a solid such as hydrated lime, and may be a gas such as ammonia.

In the second addition step, the butene oligomer is added to the organic phase obtained in the water washing step.

It is preferable that the amount of the butene oligomer added should be 25% by mass or larger, it is more preferable to be 30% by mass or larger, and it is further preferable to be 65% by mass or larger, with respect to 100 parts by mass of the butene polymer in the reaction solution.

In the second addition step, the oligomer component obtained in the distillation step may be added to the reaction solution. In this case, higher efficiency of the production process can be achieved by using an essentially unnecessary oligomer component that is formed by the polymerization reaction.

The butene polymer obtained by the production method according to the present embodiment can be, for example, a highly reactive butene polymer.

The number-average molecular weight Mn of the highly reactive butene polymer can be, for example, 1000 or higher, it is preferable to be 1100 or higher, and it is more preferable to be 2300 or higher. Also, the number-average molecular weight Mn of the highly reactive butene polymer can be, for example, 5000 or lower, and it is preferable to be 3000 or lower.

The disparity (Mw/Mn) of the highly reactive butene polymer can be, for example, 4.0 or less, it is preferable to be 3.0 or less, and it is more preferable to be 2.2 or less. The disparity of the highly reactive butene polymer may be 1.3 or more.

The ratio of a polymer having a terminal double bond to the highly reactive butene polymer (also referred to as a terminal double bond content or an α ratio) can be 70% or more, it is preferable to be 75% or more, and it is more preferable to be 78% or more.

The fluorine content of the highly reactive butene polymer can be, for example, 20 ppm by mass or smaller, it is preferable to be 10 ppm by mass or smaller, and it is more preferable to be 3 ppm by mass or smaller.

Although the preferable embodiments of the present invention are described above, the present invention is not limited by the embodiments described above.

EXAMPLES

Although the present invention will be described more specifically with reference to Examples, the present invention is not limited by Examples.

Example 1

<Preparation of Raw Material Component A1>

Isobutene and isobutane were mixed to prepare raw material component A1 having an isobutene content of 50% by mass.

<Polymerization Reaction>

The raw material component A1 was treated with AZ300 manufactured by Honeywell UOP which is a hybrid of a zeolite molecular sieve and modified activated alumina at normal temperature and then supplied, together with a boron trifluoride methanol complex catalyst (the molar ratio of boron trifluoride to methanol was 1.90), to a continuous-format vessel-type reactor having a capacity of 1.0 L, and polymerization was continuously performed at a reaction temperature of −20° C.

As a result of measuring the contents of moisture, a sulfur-containing compound and an oxygen-containing compound in the raw material component after the pretreatment with AZ300, all were 1 ppm by mass or smaller. The measurement of each content was performed by a Karl Fisher moisture titration apparatus and gas chromatography.

Details of the polymerization conditions were as given below.

Supply rate of raw material component: 1350 g/hr
Supply rate of isobutene: 11.8 to 12.1 mol/hr
Supply rate of catalyst: 0.72 g/hr
Supply rate of boron trifluoride: 0.0056 mol/hr Molar ratio of catalyst to isobutene: $4.7\times10^{-4}$
Liquid hourly space velocity: 2.3 L/L
Polymerization temperature: −20° C.

For the polymerization reaction, unreacted C4 gas was analyzed by gas chromatography to determine the conversion rate of isobutylene. The reaction solution obtained by the polymerization reaction was transferred to a container of 2.0 L in capacity having a stirrer and an ejection line at the bottom, and approximately 67 parts by mass (butene oligomer/butene polymer (mass ratio)=4/6) of a butene oligomer (dimer/trimer/tetramer/pentamer (mass ratio)=18/71/11/trace) with respect to 100 parts by mass of the reaction product in the reaction solution determined from the conversion rate of isobutene were added. Subsequently, a water in an equal amount to an organic phase was added and stirred at normal temperature for 3 minutes to deactivate the catalyst. Subsequently, the reaction solution after the catalyst deactivation was left standing and separated into an aqueous phase and an organic phase. In this operation, the state of oil-water separation 5 minutes after the still standing was evaluated by visual observation.

Water washing was performed three times for the organic phase, and then, the resultant was left standing overnight under an open condition to remove unreacted components. A crude polymer obtained as the organic phase was subjected to dehydration treatment and placed in a distillation apparatus having an oil bath as a heating source, and remaining unreacted components and oligomer components were distilled off by gradually elevating the pressure and the oil bath temperature to 3 kPa and 220° C., respectively, to recover the butene polymer of interest. At the time of the distillation, the temperature difference between the outside heat source (oil bath) and the central portion (internal liquid) of the distillation mother liquor 10 minutes after the start of heating was measured.

GPC analysis was conducted on the obtained butene polymer to determine number-average molecular weight Mn and disparity Mw/Mn. Also, the terminal double bond content (a ratio) was determined by the $^1$H-NMR measurement of the obtained butene polymer. Furthermore, the residual fluorine concentration (fluorine content) in the butene polymer was measured by a combustion ion chromatography apparatus. The apparatus used in each measurement and the measurement conditions are shown below.

[Gas Chromatography]
Measurement apparatus: GC6850 from Agilent Technologies, Inc.
Column: CP-Al2O3/KCl (column length: 50 m, inside diameter: 0.32 mm, film thickness: 5 μm)
Column temperature: 50° C. to 200° C. (5° C./min)
Carrier gas: nitrogen

[GPC Analysis]
Measurement apparatus: HLC-8320GPC from Tosoh Corp.
Column:
TSKgel guard column SuperHZ-L
 (4.6 mm I.D.×2 cm)
TSKgel SuperH/M-M
TSKgel SuperHZ4000
TSKgel SuperHZ3000
TSKgel SuperHZ2000
 (4.6 mm I.D.×15 cm each)
Column temperature: 40° C.
Carrier: THF, 1 ml/min
Detection: RI Mn and Mw detection conditions: start molecular weight (based on PS) 102747 (102700)
 end molecular weight (based on PS) 115
 measurement interval 0.00167 sec/run

[$^1$H-NMR Measurement]
Measurement apparatus: 600 MHz-proton NMR from Oxford Instruments
Sample concentration: 5% by mass (deuterated chloroform solvent)
The number of integrations: 16
Analysis conditions: Peak areas of A to D described below were determined, and the α ratio was determined as described below.
A: 5.16 ppm-5.10 ppm
B: 4.90 ppm-4.655 ppm
C: 4.655 ppm-4.57 ppm
D: 2.89 ppm-2.81 ppm $$\alpha \text{ ratio } (\%) = C/\{A+(B-C)/2+C+D\}\times 100$$

[Residual Fluorine Concentration Measurement]
Measurement apparatus: ICS1500 (ion chromatography unit) from Dionex Corp.
AQF100 (combustion unit) from Mitsubishi Chemical Corp.
Column: Ionpac AS23A
Combustion temperature: 1000° C.
Carrier: 4.5 mmol $Na_2CO_3$/0.8 mmol $NaHCO_3$ aqueous solution, 1 ml/min The conditions of each step and the observation results in Example 1 are shown in Table 1, and the properties of the obtained butene polymer are shown in Table 2.

Example 2

<Preparation of Raw Material Component A2>
C4 raffinate which was a residue of the extraction of butadiene from a C4 fraction obtained in a naphtha cracking apparatus was prepared. Components composed mainly of isobutene were obtained by isomerization distillation treatment from the C4 raffinate, and then, concentration adjustment was performed by adding n-butene to the components, to obtain raw material component A2 having an isobutene/1-butene/n-butane mass ratio of 50/1/49.

<Polymerization Reaction>
A butene polymer was obtained by performing polymerization reaction in the same way as in Example 1 except that the raw material component A2 was used instead of the raw material component A1. The conditions of each step and the observation results in Example 2 are shown in Table 1, and the properties of the obtained butene polymer are shown in Table 2.

Example 3

<Preparation of Raw Material Component A3>
Fluid catalytic cracking was performed by using a down-flow reactor-type FCC pilot apparatus. An Arabian light desulfurized atmospheric residue oil was used as a raw material oil, and a mixture of 70% by mass of a fluid catalytic cracking catalyst containing 37% by mass of ultrastable Y zeolite and 30% by mass of an additive containing 43% by mass of shape-selective zeolite was used as a fluid catalytic cracking catalyst. The operating conditions of the apparatus were set to a reaction zone exit temperature of 600° C., a reaction pressure of 196 kPa (1.0 kg/cm$^2$G), a catalyst/oil ratio (mass ratio) of 25, and a catalyst regeneration zone temperature of 720° C.

Components composed mainly of isobutene were obtained by isomerization distillation from the cracked product obtained by the fluid catalytic cracking, and then, concentration adjustment was performed by adding n-butene to the components, to obtain raw material component A3 having an isobutene/1-butene/butane mass ratio of 50/1/49.

<Polymerization Reaction>

A butene polymer was obtained by performing polymerization reaction in the same way as in Example 1 except that the raw material component A3 was used instead of the raw material component A1. The conditions of each step and the observation results in Example 3 are shown in Table 1, and the properties of the obtained butene polymer are shown in Table 2.

Example 4

<Polymerization Reaction>

A butene polymer was obtained by performing polymerization reaction in the same way as in Example 1 except that the amount of the butene oligomer added was set to 25 parts by mass with respect to 100 parts by mass of the reaction product in the reaction solution (butene oligomer/reaction product (mass ratio)=2/8). The conditions of each step and the observation results in Example 4 are shown in Table 1, and the properties of the obtained butene polymer are shown in Table 2.

Example 5

<Polymerization Reaction>

A butene polymer was obtained by performing polymerization reaction in the same way as in Example 1 except that the butene oligomer was added to the reaction solution of the polymerization reaction after catalyst deactivation and water washing. The conditions of each step and the observation results in Example 5 are shown in Table 1, and the properties of the obtained butene polymer are shown in Table 2.

Example 6

<Preparation of Raw Material Component A4>

Fluid catalytic cracking was performed by using an upflow reactor-type FCC commercial production apparatus. An Arabian light desulfurized vacuum gas oil (desulfurized VGO) was used as a raw material oil, and the same catalyst as in Example 3 was used as a fluid catalytic cracking catalyst. The operating conditions of the apparatus were set to a reaction zone exit temperature of 500° C. and a catalyst/oil ratio (mass ratio) of 5.3.

Components composed mainly of isobutene were obtained by isomerization distillation from the cracked product obtained by the fluid catalytic cracking, and then, concentration adjustment was performed by adding n-butene to the components, to obtain raw material component A4 having an isobutene/1-butene/butane mass ratio of 50/1.5/48.5.

<Polymerization Reaction>

A butene polymer was obtained by performing polymerization reaction in the same way as in Example 1 except that: the raw material component A4 was used instead of the raw material component A1; and the pretreatment with AZ300 was not performed. All of the contents of the moisture, the sulfur-containing compound and the oxygen-containing compound in the raw material component A4 were 100 ppm by mass. The conditions of each step and the observation results in Example 6 are shown in Table 1, and the properties of the obtained butene polymer are shown in Table 2.

Comparative Example 1

<Polymerization Reaction>

A butene polymer was obtained by performing polymerization reaction in the same way as in Example 1 except that the butene oligomer was not added. The conditions of each step and the observation results in Comparative Example 1 are shown in Table 1, and the properties of the obtained butene polymer are shown in Table 2.

Comparative Example 2

<Polymerization Reaction>

A butene polymer was obtained by performing polymerization reaction in the same way as in Example 1 except that the amount of the butene oligomer added was set to approximately 11 parts by mass with respect to 100 parts by mass of the reaction product in the reaction solution (butene oligomer/reaction product (mass ratio)=1/9). The conditions of each step and the observation results in Comparative Example 2 are shown in Table 1, and the properties of the obtained butene polymer are shown in Table 2.

The conditions of each step and the observation results in Examples 1 to 6 and Comparative Examples 1 to 2 are shown in Table 1. In the table, "Amount of oligomer added" represents the ratio (mass ratio) of the amount of the butene oligomer added to the reaction product in the reaction solution. "Oil-water separation at time of water washing" represents the results of evaluating the state of separation of an aqueous phase and an organic phase at the time of water washing. The evaluation results about "Oil-water separation at time of water washing" were indicated by AA in the case where the separation occurred very favorably, and the organic phase was able to be accurately recovered; A in the case where the separation occurred favorable, and the organic phase was able to be sufficiently separated; and B in the case where the separation was insufficient, and the organic phase was difficult to separate accurately. "Temperature difference at time of distillation" represents the temperature difference between the outside heat source (oil bath) and the central portion (internal liquid) of the distillation mother liquor 10 minutes after the start of heating. "Stability at time of distillation" represents the results of evaluating stability at the time of distillation. The evaluation results about "Stability at time of distillation" were indicated by AA in the case of being very stable without bumping; A in the case of being sufficiently stable with little bumping; and B in the case of being not stable with bumping facilitated. "Conversion rate" represents the conversion rate of isobutene, and "Recovery rate" represents the final yield of the butene polymer.

TABLE 1

|  | Amount of oligomer added (mass ratio) | Oil-water separation at time of water washing | Temperature difference at time of distillation (° C.) | Stability at time of distillation | Conversion rate (%) | Recovery rate (%) |
|---|---|---|---|---|---|---|
| Example 1 | 4/6 | AA | 18 | AA | 82 | 75 |
| Example 2 | 4/6 | AA | 17 | AA | 81 | 74 |
| Example 3 | 4/6 | AA | 18 | AA | 82 | 75 |
| Example 4 | 2/8 | A | 24 | A | 82 | 75 |
| Example 5 | 4/6 (Added after water washing) | B | 18 | AA | 81 | 75 |
| Example 6 | 4/6 | AA | 18 | AA | 63 | 58 |
| Comparative Example 1 | 0 | B | 40 | B | 79 | 65 |
| Comparative Example 2 | 1/9 | B | 34 | B | 80 | 70 |

The properties of the butene polymers obtained in Examples 1 to 5 and Comparative Examples 1 to 3 are shown in Table 2.

TABLE 2

|  | Mn | Mw/Mn | α ratio (%) | Fluorine content (ppm by mass) |
|---|---|---|---|---|
| Example 1 | 2910 | 1.9 | 80.1 | <1 |
| Example 2 | 2720 | 1.9 | 80.3 | 3 |
| Example 3 | 2630 | 2.0 | 79.8 | 2 |
| Example 4 | 2730 | 1.8 | 78.3 | 2 |
| Example 5 | 2900 | 1.9 | 80.1 | 48 |
| Example 6 | 900 | 2.1 | 80.1 | 3 |
| Comparative Example 1 | 2650 | 1.9 | 78.6 | 48 |
| Comparative Example 2 | 2710 | 1.9 | 79.0 | 22 |

As shown in Tables 1 and 2, in Examples 1 to 4, the oil-water separation and the stability at the time of distillation were favorable, and a butene polymer having preferable properties as a highly reactive butene polymer was obtained at a high recovery rate. In Example 5, the stability at the time of distillation was favorable, and a highly reactive butene polymer whose fluorine content was high, but the other properties were preferable was obtained at a high recovery rate. Although Example 6 was inferior in recovery rate and number-average molecular weight to the other Examples, the oil-water separation and the stability at the time of distillation were favorable, and a preferable highly reactive butene polymer having a low fluorine content was obtained. On the other hand, in Comparative Examples 1 and 2, the stability at the time of distillation was poor, the fluorine content of the obtained butene polymer was high, and the recovery rate was also low.

Example 7

<Polymerization Reaction>

A butene polymer was obtained by performing polymerization reaction in the same way as in Example 1 except that: the raw material component A2 was used as the raw material component; $CH_3CH_2AlCl_2$ (ethyl aluminum dichloride) was used as the catalyst; and the polymerization conditions were changed as given below. The conditions of each step and the observation results in Example 7 are shown in Table 3, and the properties of the obtained butene polymer are shown in Table 4. In Example 7, a chlorine content was measured instead of the fluorine content.

Supply rate of raw material component: 1200 g/hr
Supply rate of isobutene: 10.6 mol/hr
Supply rate of catalyst: 0.0253 mol/hr
Molar ratio of catalyst to isobutene: $2.4 \times 10^{-3}$
Liquid hourly space velocity: 1.1 L/L
Polymerization temperature: −15° C.

Comparative Example 3

<Polymerization Reaction>

A butene polymer was obtained by performing polymerization reaction in the same way as in Example 7 except that the amount of the butene oligomer added was set to approximately 5 parts by mass with respect to 100 parts by mass of the reaction product in the reaction solution (butene oligomer/butene polymer (mass ratio)=0.5/9.5). The conditions of each step and the observation results in Comparative Example 3 are shown in Table 3, and the properties of the obtained butene polymer are shown in Table 4.

TABLE 3

|  | Amount of oligomer added (mass ratio) | Oil-water separation at time of water washing | Temperature difference at time of distillation (° C.) | Stability at time of distillation | Conversion rate (%) | Recovery rate (%) |
|---|---|---|---|---|---|---|
| Example 7 | 4/6 | AA | 18 | AA | 81 | 74 |
| Comparative Example 3 | 0.5/9.5 | B | 36 | B | 80 | 67 |

TABLE 4

| | Mn | Mw/Mn | Chlorine content (ppm by mass) |
|---|---|---|---|
| Example 7 | 28500 | 2.4 | 4 |
| Comparative Example 3 | 25200 | 2.4 | 43 |

In Example 7, the oil-water separation and the stability at the time of distillation were favorable, and a butene polymer having favorable properties was obtained at a high recovery rate. On the other hand, in Comparative Example 3, the oil-water separation and the stability at the time of distillation were poor.

INDUSTRIAL APPLICABILITY

According to the method for producing a butene polymer according to the present invention, a high-quality butene polymer can be produced with good productivity.

The invention claimed is:

1. A method for producing a butene polymer, comprising:
performing polymerization reaction by contacting a raw material component comprising 20% by mass or more of isobutene with a Lewis acid catalyst;
adding a butene oligomer to the reaction solution of the polymerization reaction;
water-washing the reaction solution supplemented with the butene oligomer to obtain the solution to be treated containing the reaction product and the butene oligomer; and
subjecting the solution to be treated containing a reaction product of the polymerization reaction and a butene oligomer added to the reaction product to distillation treatment to obtain the butene polymer, wherein
an amount of the butene oligomer added is 25 parts by mass or larger with respect to 100 parts by mass of the reaction product.

2. The method according to claim 1, wherein the butene oligomer is a mixture of a dimer to a pentamer of butene.

3. The method according to claim 1, wherein the Lewis acid catalyst is aluminum chloride, alkyl aluminum dichloride or a boron trifluoride complex.

4. The method according to claim 3, wherein
the boron trifluoride complex is a complex of boron trifluoride and a complexing agent, and
the complexing agent is a primary alcohol.

5. The method according to claim 1, wherein each of contents of moisture, a sulfur-containing compound and an oxygen-containing compound in the raw material component in the polymerization is 100 ppm by mass or smaller.

6. The method according to claim 1, further comprising, before the polymerization, adjusting each of the contents of moisture, a sulfur-containing compound and an oxygen-containing compound in the raw material component to 100 ppm by mass or smaller by contacting the raw material component with a solid treatment agent.

7. The method according to claim 1, wherein the amount of the butene oligomer added is 65 parts by mass or larger with respect to 100 parts by mass of the reaction product.

8. The method according to claim 1, wherein a content of 1,3-butadiene in the raw material component in the polymerization is 1000 ppm by mass or smaller.

9. The method according to claim 1, wherein
the distillation comprises subjecting the solution to be treated to distillation treatment to obtain the butene polymer and an oligomer component comprising the butene oligomer, and
the oligomer component is recycled for addition to the reaction product.

10. The method according to claim 1, wherein the raw material component comprises a dilution of isobutene with a saturated hydrocarbon.

11. The method according to claim 1, wherein the raw material component comprises a mixture of hydrocarbons having 4 carbon atoms formed by naphtha cracking.

12. The method according to claim 1, wherein the raw material component comprises a mixture of hydrocarbons having 4 carbon atoms obtained by first fluid catalytic cracking of contacting a heavy oil with a fluid catalytic cracking catalyst on the conditions that a reaction zone exit temperature is 400° C. or higher and lower than 550° C., a catalyst/oil ratio is 2.0 to 15.0 in terms of a mass ratio, and a residence time of hydrocarbons in the reaction zone is 1.0 to 10.0 seconds.

13. The method according to claim 1, wherein the raw material component comprises a mixture of hydrocarbons having 4 carbon atoms obtained by second fluid catalytic cracking of contacting a heavy oil with a catalyst containing 12 to 24% by mass of shape-selective zeolite on the conditions that a reaction zone exit temperature is 580 to 630° C., a catalyst/oil ratio is 15 to 40 in terms of a mass ratio, and a residence time of hydrocarbons in the reaction zone is 0.1 to 1.0 seconds.

\* \* \* \* \*